United States Patent Office 3,190,754
Patented June 22, 1965

3,190,754
QUICK-COOKING WHEAT PROCESS
Richard D. Mathews, Palo Alto, Calif., assignor to Idaho Wheat Commission, an unincorporated association
No Drawing. Filed May 6, 1963, Ser. No. 278,449
3 Claims. (Cl. 99—80)

This invention relates to a method of making wheat quick-cooking.

Whole wheat has not found extensive use as an article of food for the reason that it requires such a long cooking time. For instance, ordinary untreated wheat requires over 100 minutes of cooking in boiling water to achieve a 200% increase in weight, which increase represents sufficient cooking to make the wheat palatable. Although methods have been proposed for rendering wheat quick-cooking, none of them utilizing whole wheat have found a ready acceptance. One process which has been practiced for many years is the preparation of Bulgar wherein cracked grain is parboiled and then dried. However, in cracking the grain, considerable food value is lost, particularly in the production of fines which must be discarded in making a commercially-acceptable product.

In accordance with the present invention, a process is provided for rendering wheat quick-cooking so that the wheat will be fully cooked in from 25 to 35 minutes, in contrast with the untreated wheat, which requires almost two hours of cooking to render it palatable.

The processed wheat of the present invention resembles ordinary untreated wheat in color and size, although some varieties of wheat become slightly darkened. The processed wheat of the present invention can be cooked by boiling it so that it can be used in a manner similar to rice, either by itself or in various dishes. It can also be eaten as a breakfast cereal. Additionally, the processed wheat can be used in candy, cookies, and the like. When used in this way, it may be used without rehydration after cooking it in deep fat, and after such cooking has a nutty flavor.

Another advantage of the treated wheat of the present invention is that the treatment kills the germ, so that the dry, treated wheat can be kept almost indefinitely without deterioration.

Generally speaking, the process of the present invention consists of immersing the wheat for a short period of time in a solution of sodium hydroxide, to which a small amount of ammonia salt has been added. The ammonia salt aids in the penetration of sodium hydroxide, so that the soaking time in sodium hydroxide can be very short. If the ammonia were omitted, it would require a long soaking time in concentrated sodium hydroxide which would result in a discolored, poor-tasting product. The wheat is then rinsed in boiling water, then soaked in cold water, and then in a dilute acid solution, followed by another cold water rinse. It is then dried. The soak in the dilute acid solution is for the purpose of neutralizing the sodium hydroxide and improving the flavor, since otherwise the wheat may have a slightly alkaline taste.

In a specific embodiment of the process, a quantity of wheat was soaked in a solution containing 10% sodium hydroxide and 2% ammonium sulfate for one minute at a temperature of 90–95° C. Sufficient solution was used to cover the wheat. After one minute, the solution was drained off the wheat and the wheat was placed in boiling water for two minutes. The boiling water gets rid of the alkali at a rapid rate and also causes penetration of the water into the wheat. The wheat was then rinsed in cold water for one or two minutes and was then soaked in a 1% solution of citric acid for one hour at 50° C. while the solution was gently circulated through the wheat. The wheat was then again subjected to a cold water rinse and was dried to produce the final product. The drying was conducted at 80° C. for one hour, followed by about 12 hours of drying at 40–45° C.

A number of variations can be made in the process outlined above. The concentration of the sodium hydroxide can be varied from about 5% to about 15%. If the concentration of the sodium hydroxide is much above 15%, there will be a flavor of residual salt in the wheat even after the alkali is neutralized. Below about 5% sodium hydroxide, it is impossible to make a quick-cooking wheat even upon prolonged cooking. At 7½% sodium hydroxide, the soaking time must be increased to 2 or 3 minutes instead of the 1 minute necessary at 10% sodium hydroxide. Generally, longer soaking times in the sodium hydroxide solution are undesirable since longer soaking times cause a change in the color, making an unattractive product. The amount of ammonium hydroxide can be varied from about ½ to 3%, but it has been found that about 2% is optimum. The ammonium ion can be added in any convenient form, such as ammonium hydroxide, ammonium sulfate, or ammonium chloride. Generally speaking, ammonium sulfate is preferred since it is more stable than ammonium hydroxide solution. Instead of the citric acid used, one can employ acetic acid, but citric acid is preferred since it gives a better flavor and color to the finished wheat.

The drying is not particularly critical, and one could dry for the entire period at temperatures around 40 or 50° C., but this would require a substantially longer period. It is not desirable to dry at 80° C. for more than one hour, since at the end of this time the wheat has lost so much moisture that the temperature of the wheat itself begins to rise.

Surprisingly enough, exactly the same process can be employed utilizing either hard or soft wheat. Hard wheat which has been treated in accordance with the process of the present invention tends to rehydrate faster during the initial hydration period than treated soft wheat, but then the hydration proceeds at a slower rate than with the soft wheat, so that both types of wheat require about the same ultimate rehydration time.

I claim:
1. The process of rendering wheat quick-cooking comprising immersing the wheat in a solution containing from 5% to 15% sodium hydroxide and from 0.5 to 3% of a non-toxic ammonium salt for a time sufficient for the solution to penetrate the wheat, washing the alkaline material out of the wheat, neutralizing and drying the wheat.
2. The process of treating wheat to render it quick-cooking comprising the steps of:
  (a) soaking the wheat for a period of about one minute at a temperature of from 90° to 95° C. in a solution containing about 10% sodium hydroxide and about 2% ammonium sulfate;
  (b) draining the alkaline solution from the wheat and soaking the wheat in boiling water for two minutes;
  (c) rinsing the wheat in cold water for a few minutes;

(d) soaking the wheat for about one hour at 50° C. in an acidic solution, said acidic solution consisting of about 1% of an acid selected from the group consisting of acetic and citric acids;
(e) rinsing the wheat in cold water; and
(f) drying the wheat to substantial dryness.

3. The process of claim 2 wherein drying is conducted at a temperature of about 80° C. for one hour, followed by drying at a temperature of 40 to 45° C. for about twelve hours.

References Cited by the Examiner
UNITED STATES PATENTS

| 1,265,700 | 5/18 | Von Hagen | 99—80 |
| 2,713,542 | 7/55 | D'Atri | 99—80 |

A. LOUIS MONACELL, *Primary Examiner.*

RAYMOND N. JONES, *Examiner.*